United States Patent [19]

De Langhe

[11] Patent Number: 4,660,593

[45] Date of Patent: Apr. 28, 1987

[54] HOT-BLAST GATE VALVE

[75] Inventor: Heli De Langhe, Evergem, Belgium

[73] Assignee: Sidmar S/A, Ghent, Belgium

[21] Appl. No.: 767,357

[22] Filed: Aug. 19, 1985

[30] Foreign Application Priority Data

Aug. 17, 1984 [LU] Luxembourg .............................. 85513

[51] Int. Cl.⁴ ............................................. F16K 49/00
[52] U.S. Cl. .................................... 137/340; 251/172;
251/328
[58] Field of Search ................ 137/340; 251/172, 193,
251/326, 328

[56] References Cited

U.S. PATENT DOCUMENTS

| | | | |
|---|---|---|---|
| 2,914,294 | 11/1959 | Beatty | 251/172 |
| 3,266,517 | 8/1966 | Carr | 137/340 |
| 3,877,481 | 4/1975 | Sharp et al. | 137/340 |
| 3,921,671 | 11/1975 | Granstrom et al. | 137/340 |
| 3,941,186 | 3/1976 | Schneider | 137/340 |
| 4,161,959 | 7/1979 | Jansen et al. | 137/340 |
| 4,402,337 | 9/1983 | Schuurman | 137/340 |

Primary Examiner—Martin P. Schwadron
Assistant Examiner—Sheri M. Novack
Attorney, Agent, or Firm—Michael J. Striker

[57] ABSTRACT

A hot-blast valve for use between a regenerative heating stove on and a blast furnace downstream therefrom in the direction of flow from the stove to the furnace according to the invention has a valve housing made of metal plate and having a lateral gate pocket. Annular upstream and downstream seats define a flow passage and the upstream seat is made of metal and the downstream seat of solid refractory material. A gate is displaceable between the seats between a closed position engaging same and blocking the passage and an open position clear of same in the pocket with the passage open. A coolant is circulated through the upstream seat only.

10 Claims, 5 Drawing Figures

HOT-BLAST GATE VALVE

FIELD OF THE INVENTION

The present invention relates to a hot-blast gate valve. More particularly this invention concerns the valve used on the hot side of a hot-blast stove.

BACKGROUND OF THE INVENTION

A regenerative heating plant for a blast furnace has several, normally three, cowper-type regenerative-heating stoves connected via respective hot-blast valves to a common hot-blast main itself connected to the tuyeres of the furnace. The stoves each have a small-section combustion chamber that is mainly empty and a larger heating chamber that is filled with checker brick. The two chambers are vertically elongated and communicate at their upper ends at the stove dome. The lower end of the heating chamber can be connected via a respective stack valve to an exhaust line leading via treatment scrubbers to the smokestack, or via cold-blast valve to a cold-blast line pressurized with ambient air. The lower region of the combustion chamber has a port connected to the respective hot-blast valve and the bottom of this combustion chamber is connected to or has a burner.

During firing of the stove the heating chamber is isolated by the respective cold-blast valve from the cold-blast main and the respective stack valve is open so the heating chamber is connected to the stack, the hot-blast valve is closed, and the burner is fired so that combustion takes place in the combustion chamber and the hot combustion gases pass through the checker brick in the heating chamber and heat same to 900° C. to 1300° C., these gases then exiting to the stack. For regenerative heating the burner is isolated by its valve, the stack valve is closed, the cold-blast is open, and the hot-blast valve is open. Ambient air is thereby forced up through the hot brick and down through the hot combustion chamber, whence it passes out through the hot-blast valve and through the hot-blast main to the tuyeres of the furnace. Several such stoves are provided so that two can be firing while one is used. Thus the furnace can operate continuously with regeneratively heated air.

The hot-blast valves are therefore subjected to considerable stress, being heated often as high as 1400° C. As a result massive gate valves are employed often with flow cross sections of 1 m². Cast iron for the valves was superseded by cast steel valve housings with copper seats constructed with passages through which a coolant can circulate. Even such valves normally only had a service life of a few weeks.

The present-day capacity of welding steel has made it possible for weld steel to be used in such valves, giving substantially longer service lives. Normally the valve housing is covered with a refractory material to shield it from the high heat it is exposed during firing of the respective stove.

This welded construction is under considerable stress which can lead to cracking and leakage where the valve body joins the pocket that the gate is retracted into when the hot-blast valve is open. These stresses are caused by temperature gradients induced in the metal of the valve housing when the system is working.

Furthermore, a substantial amount of heat is lost from the hot blast because of the large cooling surface. In addition the energy consumption to cool the seat is considerable and objectionable because no useful work is done.

OBJECTS OF THE INVENTION

It is therefore an object of the present invention to provide an improved hot-blast valve.

Another object is the provision of such a hot-blast valve which overcomes the above-given disadvantages, that is which has a long service life and that is not costly to cool.

SUMMARY OF THE INVENTION

A hot-blast valve for use between a regenerative heating stove and a blast furnace downstream therefrom in the direction of flow from the stove to the furnace according to the invention has a valve housing made of metal plate and having a lateral gate pocket. Annular upstream and downstream seats define a flow passage and the upstream seat is made of metal and the downstream seat of solid refractory material. A gate is displaceable between the seats between a closed position engaging same and blocking the passage and an open position clear of same in the pocket with the passage open. A coolant is circulated through the upstream seat only.

Such an arrangement is effective since the downstream seat in a hot-blast valve has no particular sealing functions because when the valve is closed the pressure is always greater downstream. Thus the gate will always be pressed by this pressure differential against the upstream seat. By only using one seat the energy consumed with cooling the seats in a prior-art system are cut by half. The downstream seat can be a simple refractory structure serving mainly to guide, not to seal with, the valve body.

According to another feature of this invention the metal plate of the housing is spaced from the passage. This is achieved by providing it with a thick refractory lining exposed to the passage. The lining is of insulating-type refractory concrete.

It is also possible according to this invention for the upstream seat to be hollow and formed with an annular chamber connected to the cooling unit. The housing can further be formed adjacent the upstream seat with another annular chamber connected to the cooler and can have a mounting flange at this other chamber.

The flow cross section of the flow passage at the upstream seat is slightly smaller than the flow cross section at the downstream seat. This reduces turbulence and heat loss at the valve.

For servicing the upstream seat is removably mounted in the housing. In addition the housing has a refractory-concrete lining downstream of the seats, and upstream of the seats the housing has the metallic upstream seat and a refractory lining. The plates of the housing are otherwise directly exposed to the surroundings on their outer surfaces.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figure 1:
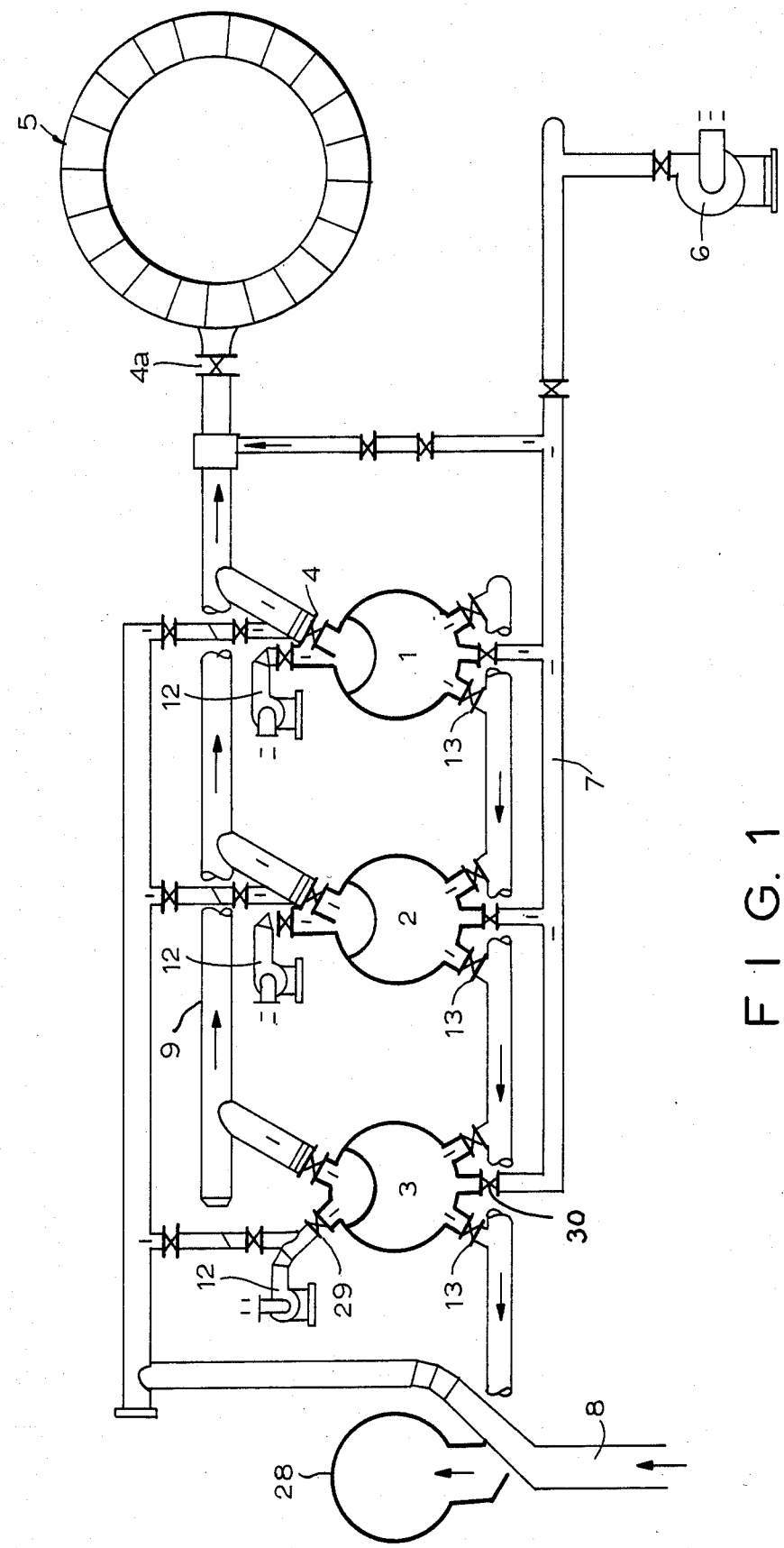
FIG. 1 is a largely diagrammatic top view of a blast furnace and its regenerative heating plant.

As seen in FIG. 1 a blast furnace is connected via a hot-blast main 9 having a valve 4a to three Cowper-type regenerative heating stoves 1, 2, and 3 via respective hot-blast valves 4. Respective burner/blowers 12 open via burner valves 29 into the bottoms of the combustion chambers of the stoves 1, 2, and 3, and the lower ends of the respective heating chambers are connected via valves 13 either to the smokestack 28 or to the cold-blast main 7 that is continuously pressurized by a blower 6 with ambient air. Blast-furnace off gas is fed in via a main 8 for combustion in the stoves 1, 2, and 3. As is usual, during firing the hot-blast valves 4 are closed and the valves 13 connect the heating chambers to the stack 28, so that the checker brick in the heating chamber is heated by the combustion in the combustion chamber. Once the brick is about 900° C. to 1300° C. the burner valves 29 are closed, the valves 13 are closed to disconnect the stoves 1, 2, and 3 from the stack 28, and the hot- and cold-blast valves 4 and 30 are opened so that the gas fed to the tuyeres in the furnace 5 is preheated.

Figure 2:
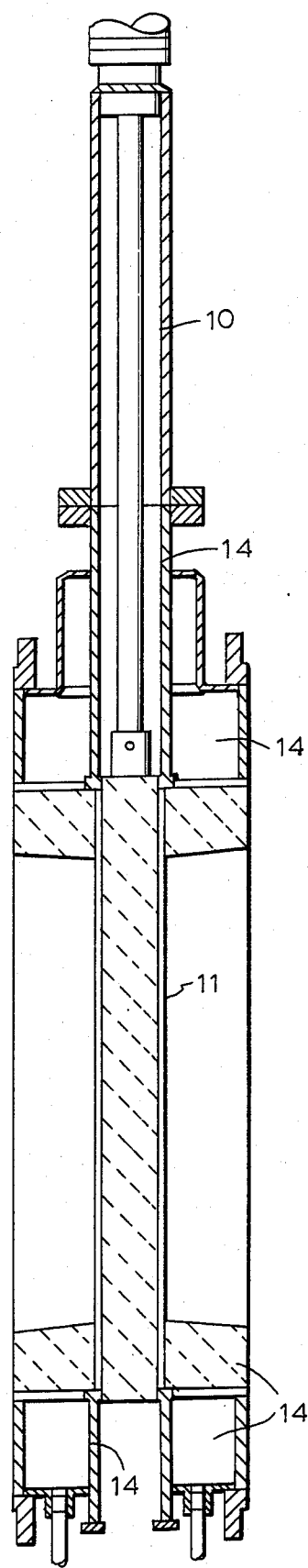
FIGS. 2 and 3 are vertical sections through hot-blast valves according to the prior art.

FIG. 2 shows a prior-art welded steel hot-blast valve having a housing 14, a gate pocket 10, and a gate 11. The housing 14 and the gate 11 are cooled by water. It is possible to connect the coolant path of the housing in series with that of the gate, but normally two separate systems are provided. Typically that for the housing 14 operates at approximately 50 m³/hr while that of the gate works at a throughput of 25 m³/hr. The coolant system for the housing has two portions each cooling a respective seat.

Figure 3:
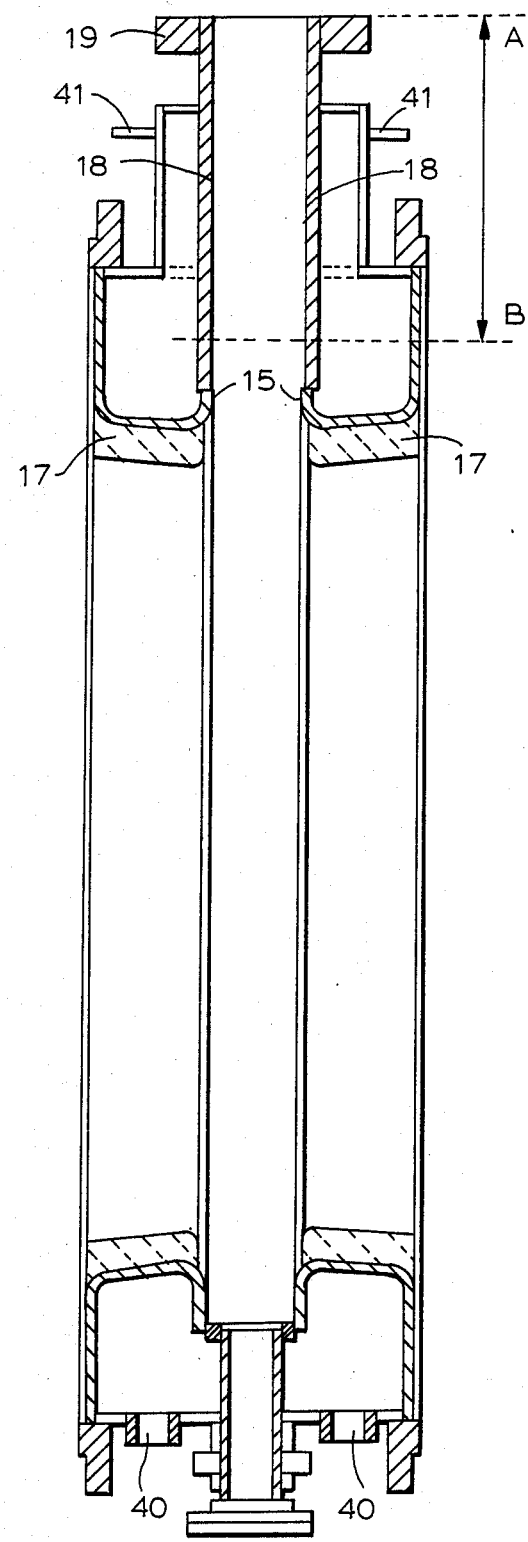

FIG. 3 shows another prior-art valve having upstream and downstream seats 15 and 16 both formed of hollow steel rings connected so a coolant can flow through them. The inner surfaces of the housing are covered by a refractory lining 17. Coolant water flows into the seats 15 and 16 through connections 40 at the bottom of them and exits at connections 41 at the top of them.

In this arrangement strong internal stresses are produced in the upper region indicated at A—B in FIG. 3. The square flange 19 which joins the valve housing to the pocket deforms. This cracks the weld joints and creates leaks. The stresses originate in the considerable temperature gradient in the steel structure 18 of the housing and in the seats 15 and 16 while the system is operating.

Figure 4:
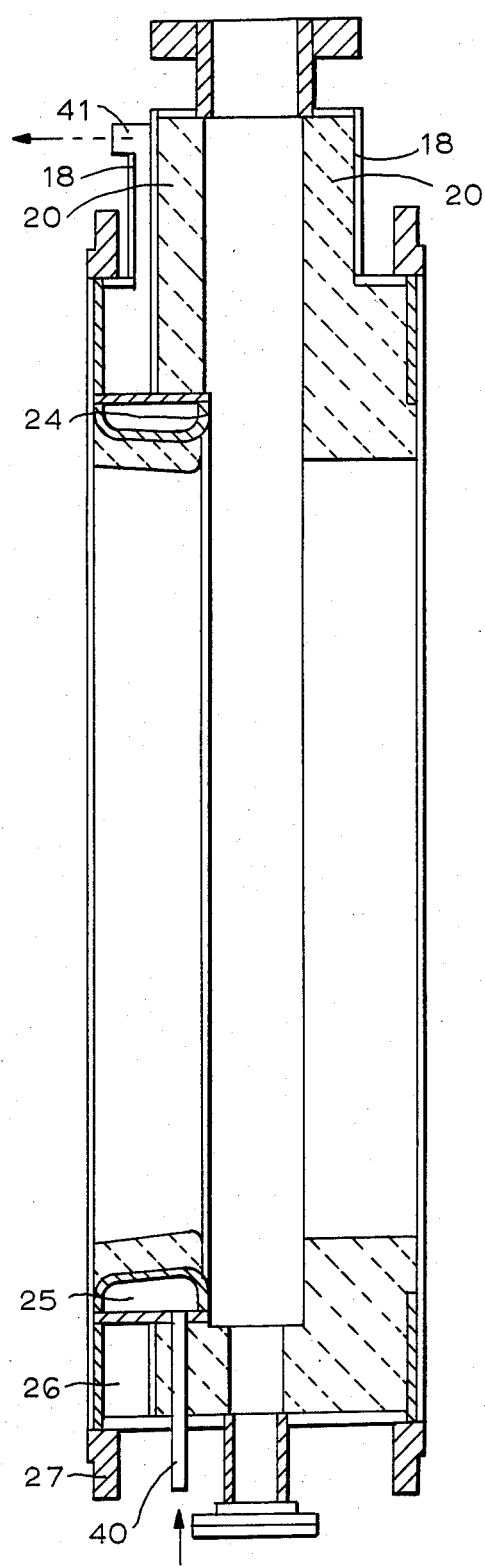
FIGS. 4 and 5 are vertical sections through hot-blast valves according to the instant invention.

According to the invention the deformation of the flange 19 and the considerable temperature gradient in the metal are avoided by moving this metallic structure outward on the valve housing and protecting it on the upstream side with a refractory insulating material 20 as seen in FIG. 4. In addition to reduce heat losses in the hot-blast gas, one only uses a single hollow cooled metal seat 24 at the upstream side. The downstream seat is simply formed of the refractory lining 20.

The pressure differential across the hot-blast valve when it is closed never changes; the pressure is always greater downstream, to the right in FIG. 4. This is because the hot-blast gas is always at a higher pressure than the combustion gases so it can emerge at high speed from the tuyeres. Thus there is in effect no real sealing at the downstream seat; in effect the pressure differential holds the gate against the upstream seat and the downstream seat is unnecessary.

Figure 5:
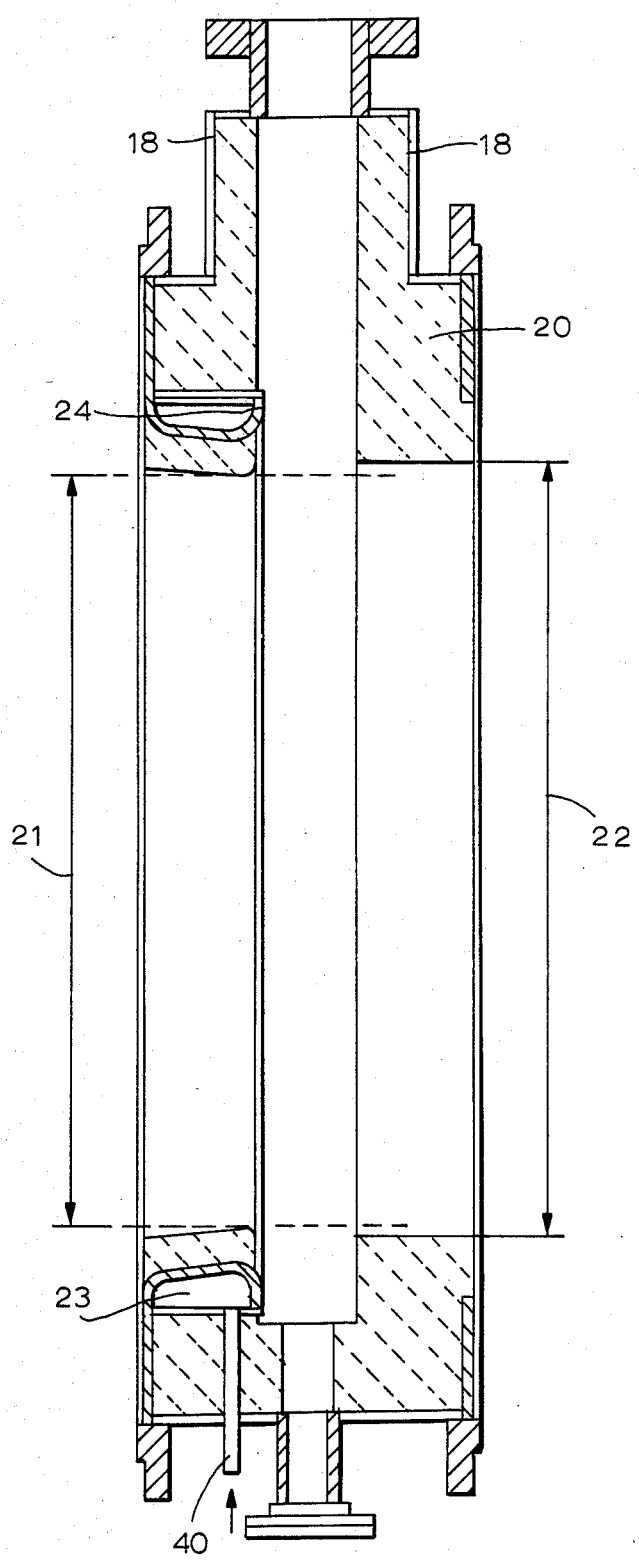

The seat can be cooled with two chambers as shown at 25 and 26 in FIG. 4 to also cool the flange 27 by which it is connected to the upstream hot-blast conduit coming from the respective stove. It is also possible to use a single chamber such as indicated at 23 in FIG. 5 to limit the amount of cooling water used. Either way there is only a single seat that needs to be cooled so the volume of cooling water and the energy waste will be reduced over old two-seat systems. The small cooling load allows the circuits for the gate and seat to be connected in series.

In order to reduce turbulence in the hot blast passing from left to right as seen in the drawing through the valve, and to reduce the pressure drop, the diameter 22 of the downstream seat is slightly larger than the diameter 21 of the upstream seat 24, the term "seat" being used even though the downstream structure has no real sealing function. Thus favorably affects energy consumption and on the heat loss to the coolant.

I claim:

1. A hot-blast valve for use on a flow between a regenerative heating stove and a blast furnace downstream therefrom in a direction of the flow from the stove to the furnace, the flow having an upstream and a downstream pressure with respect to the valve, the valve comprising:
   a valve housing made of metal plate;
   a lateral gate pocket located outside of and connected to said housing in a connection region;
   annular upstream and downstream seats within said housing and defining a flow passage, said upstream seat being made of metal and said downstream seat being made of solid refractory material;
   a gate dispalceable between a closed position in which said gate blocks said passage by being between said seats and engages only said upstream seat because of said downstream pressure is greater than said upstream pressure, and an open position in which said gate opens said passage by being within said pocket and clearing said seats; and
   means for circulating a coolant through the upstream seat only in said open and closed positions of said gate.

2. The hot-blast valve defined in claim 1 wherein the metal plate of the housing is spaced from the passage.

3. The hot-blast valve defined in claim 2 wherein the housing includes a thick refractory lining exposed to the passage.

4. The hot-blast valve defined in claim 3 wherein the lining is of insulating-type refractory concrete.

5. The hot-blast valve defined in claim 1 wherein the upstream seat is hollow and formed with an annular chamber connected to the means.

6. The hot-blast valve defined in claim 5 wherein the housing is formed adjacent the upstream seat with another annular chamber connected to the means and the housing has a mounting flange at this other chamber.

7. The hot-blast valve defined in claim 1 wherein the flow cross section of the flow passage at the upstream seat is slightly smaller than the flow cross section at the downstream seat.

8. The hot-blast valve defined in claim 1 wherein the upstream seat is mounted in the housing, yet is removable from the housing for servicing.

9. The hot-blast valve defined in claim 1 wherein all said solid refractory material is composed of refractory-concrete lining, the housing having an outside surface which is externally exposed.

10. The hot blast valve defined in claim 1; further comprising solid refractory material between said upstream seat and said gate pocket.

* * * * *